United States Patent
Cobb et al.

(10) Patent No.: US 7,043,547 B2
(45) Date of Patent: May 9, 2006

(54) SERVER AVAILABILITY REPORTING USING ASYNCHRONOUS E-MAIL MESSAGE

(75) Inventors: Berry A. Cobb, Scottsdale, AZ (US); Jiyu Lin, Erie, CO (US)

(73) Assignee: International Business Machines Corporation, Armonk, NY (US)

( * ) Notice: Subject to any disclaimer, the term of this patent is extended or adjusted under 35 U.S.C. 154(b) by 745 days.

(21) Appl. No.: 09/897,005

(22) Filed: Jun. 29, 2001

(65) Prior Publication Data

US 2003/0005059 A1    Jan. 2, 2003

(51) Int. Cl.
*G06F 15/173* (2006.01)
*G06F 15/16* (2006.01)

(52) U.S. Cl. .................. 709/224; 709/205; 709/206

(58) Field of Classification Search ............... 709/206, 709/219, 223, 205; 707/10; 379/113–114
See application file for complete search history.

(56) References Cited

U.S. PATENT DOCUMENTS

| 5,610,915 | A | 3/1997 | Elliott et al. |
| 5,765,033 | A | 6/1998 | Miloslavsky |
| 5,825,769 | A | 10/1998 | O'Reilly et al. |
| 6,115,693 | A | 9/2000 | McDonough et al. |
| 6,122,632 | A | 9/2000 | Botts et al. |
| 6,128,646 | A | 10/2000 | Miloslavsky |
| 6,167,431 | A | 12/2000 | Gillies et al. |
| 6,175,832 | B1 * | 1/2001 | Luzzi et al. .................. 707/10 |
| 6,415,290 | B1 * | 7/2002 | Botts et al. .................. 707/10 |
| 2001/0048737 | A1 * | 12/2001 | Goldberg et al. ...... 379/114.13 |
| 2003/0018729 | A1 * | 1/2003 | Miloslavsky ................ 709/206 |

* cited by examiner

*Primary Examiner*—Patrice Winder
(74) *Attorney, Agent, or Firm*—John S. Sensny

(57) ABSTRACT

A method and system for reporting availability of a plurality of servers. The method comprises the steps of for each of said plurality of servers, periodically searching a log file for indication of a crash or shutdown or start, computing the time said crash or shutdown or start occurred, and sending said time and indication as an e-mail to a database on a server. The method further comprises the steps of calculating the duration of downtime for each said crash or said shutdown; for each server, sorting said e-mail by order received; and displaying for each of said plurality of servers, said duration of downtime in said order. For example, the sending step includes the step of sending said e-mail to a database on a pre-identified one server; and the sorting step includes the step of sorting said e-mail by order received by said pre-identified one server. Also, with a preferred embodiment, each of the plurality of servers includes an e-mail function; and the sending step includes the step of, each server using its e-mail function to send the time and indication to said database.

2 Claims, 3 Drawing Sheets

SERVER AVAILABILITY REPORTING USING ASYNCHRONOUS E-MAIL MESSAGE

BACKGROUND OF THE INVENTION

1. Field of the Invention

This invention generally relates to distributed data processing systems. More specifically, the invention relates to methods and systems for reporting the availability of servers in a distributed system.

2. Prior Art

Some conventional data processing environments comprise a plurality of user terminals or work stations connected to a central host data processing system. Such data processing environments are typically referred as central or host environments. Increasing in popularity are distributed data processing environments in which user terminals or work stations are connected to plural server data processing systems.

In a typical distributed environment employing a distributed database management system, a group of administrators collectively perform operational tasks associated with management of servers such as Groupware and E mail servers. Both E Mail and Groupware applications usually generate megabytes of information during normal daily operation. The information is typically stored in a log format. The logs are preferably processed with a view to identifying error conditions and thus to eliminating or at least reducing application server failures. However, the processing of such logs is a laborious activity.

One particular problem associated with distributed database environments is to provide statistics relating to server availability for a large distributed system, for example one having more than 250 servers. The prior art tools use either data replication or polling to retrieve the necessary data, which either consume huge disk space and bandwidth or take too long for a large number of servers. More specifically, if data replication is used to retrieve the necessary data, then the same amount of data would need to be stored 250 times, and the same data would need to be transmitted through the network 250 times. This is a waste of substantial storage space and bandwidth.

SUMMARY OF THE INVENTION

An object of this invention is to provide an improved method and system for reporting the availability of servers in a distributed data processing system.

Another object of the present invention is to report information on the availability of distributed servers, in a way that decreases the data storage and bandwidth requirements.

These and other objectives are attained with a method and system for reporting availability of a plurality of servers. The method comprises the steps of for each of said plurality of servers, periodically searching a log file for indication of a crash or shutdown or start, computing the time said crash or shutdown or start occurred, and sending said time and indication as an e-mail to a database on a server. The method further comprises the steps of calculating the duration of downtime for each said crash or said shutdown; for each server, sorting said e-mail by order received; and displaying for each of said plurality of servers, said duration of downtime in said order.

For example, the sending step includes the step of sending said e-mail to a database on a pre-identified one server; and the sorting step includes the step of sorting said e-mail by order received by said pre-identified one server. Also, with a preferred embodiment, each of the plurality of servers includes an e-mail function; and the sending step includes the step of, each server using its e-mail function to send the time and indication to said database.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
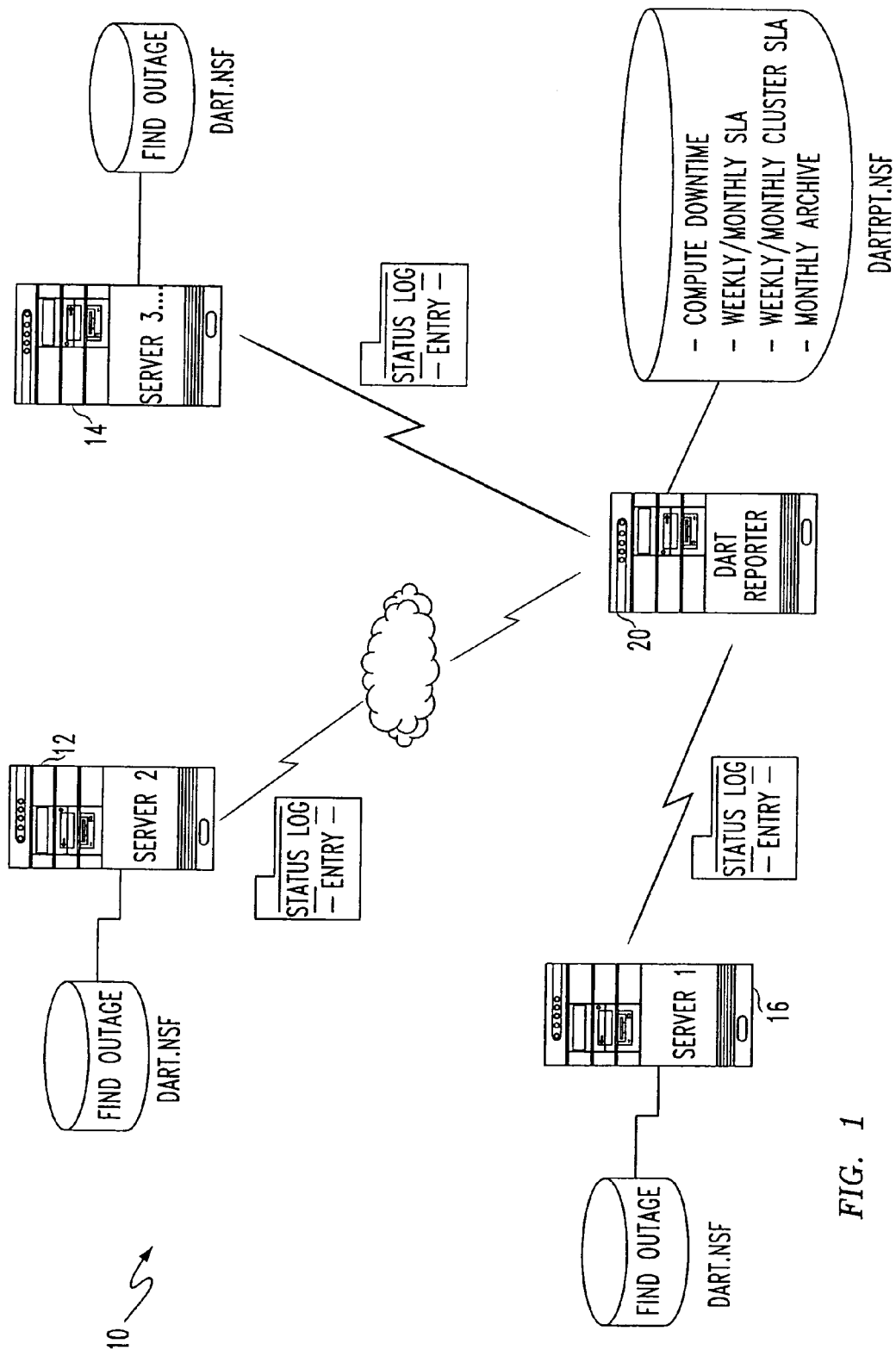
FIG. 1 illustrates a distributed data processing system.
Figure 2:
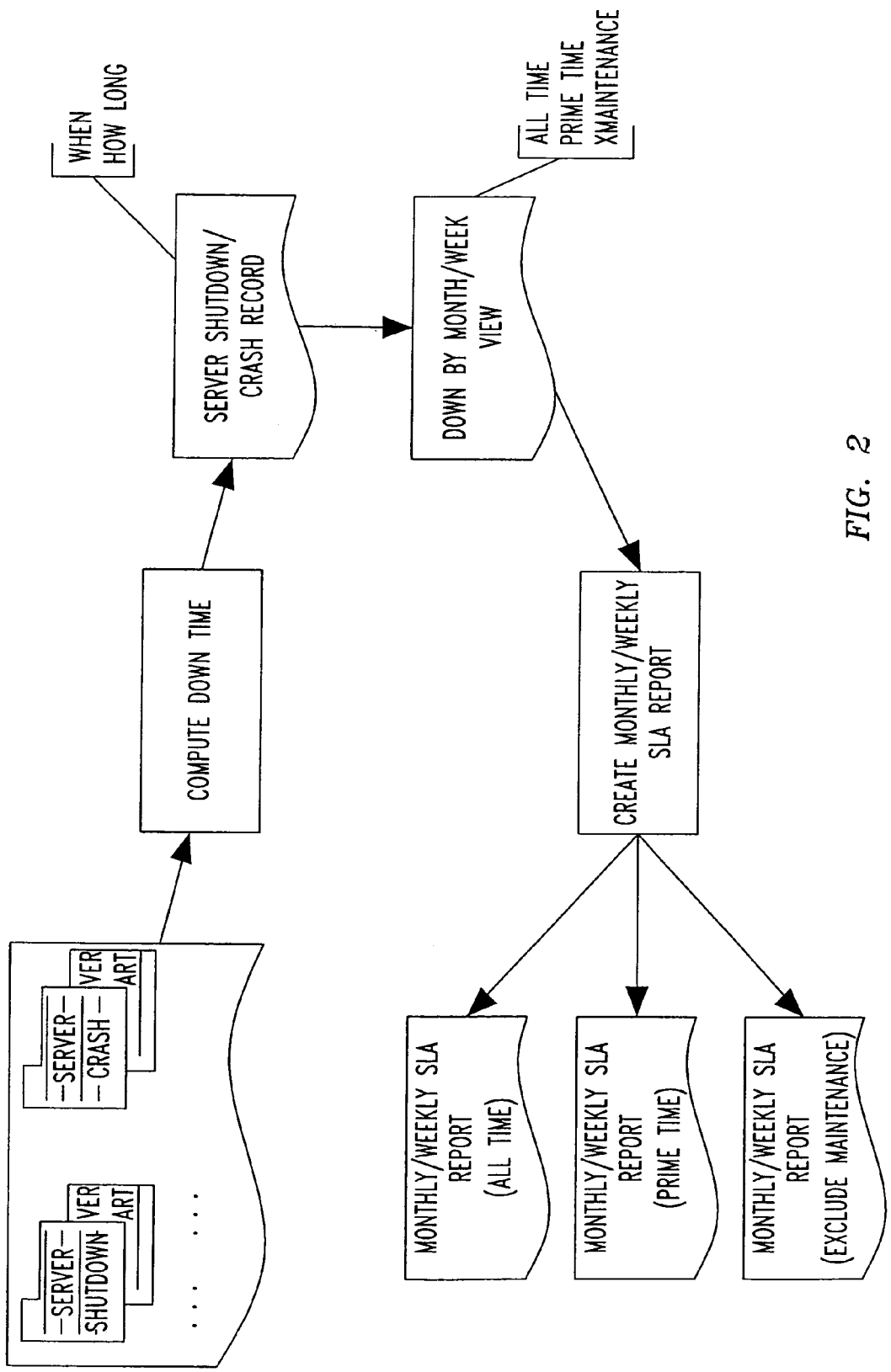
FIG. 2 shows one procedure for compiling and reporting statistics on the availability of a group of distributed servers.

With reference to FIGS. 1 and 2, a distributed data processing system 10 embodying the present invention comprises a plurality of application server computer systems 12, 14, 16 and a Reporter or Monitor server computer system 20 all interconnected via a network. Each application server provides a service to a set of client user terminals or work stations, and preferably the Reporter server 12 is connected to an administration terminal or work station. It should be noted that FIG. 1 is a very simplified illustration of a distributed data processing system. In practice, system 10 may have many more application servers than the three shown in FIG. 1, and the system may have many additional devices or elements not expressly shown in the Figure.

In the operation of system 10, the servers collect data about themselves. These data typically include information identifying when each server was started and stopped, and data relating to why the server stopped operating. For example, these data may indicate that operation of a server was stopped by the user, as the result of normal operation of the server, or because the server, or system 10, crashed—that is, as the result of some fault or error by the server or system 10. Other data may also be collected.

Reporter 20 collects data from servers 12, 14, 16 and issues reports indicating the availability of the servers. Commonly, these reports may be issued on a daily, weekly, or monthly basis. In order to do this, Reporter 20 may maintain data for an extended length of time. As discussed above, with prior art systems, the Reporter obtains the desired information by polling or by replication. In accordance with the present invention, each application server of system 10 sends, or pushes, the desired information to Reporter 20 by electronic mail.

The use of e-mail to push data to a centralized server is much more efficient, in comparison to data replication or polling, in terms of disk space, network bandwidth and speed. The approach of this invention is also easier for administrators to maintain, and can be deployed easily across multiple domains.

System 10, preferably, uses Domino server's built-in e-mail capability to send the necessary data to a central server 20. In this way, the storage and bandwidth requirements have significantly decreased, for example by 250 times. This approach also solves a problem that is unsolvable by the polling method: when an outage indicator is received, the polling method cannot determine whether it is the server or it is the network that suffered the outage. The present invention has an added advantage that it can be deployed on multiple domains easily.

Figure 3:
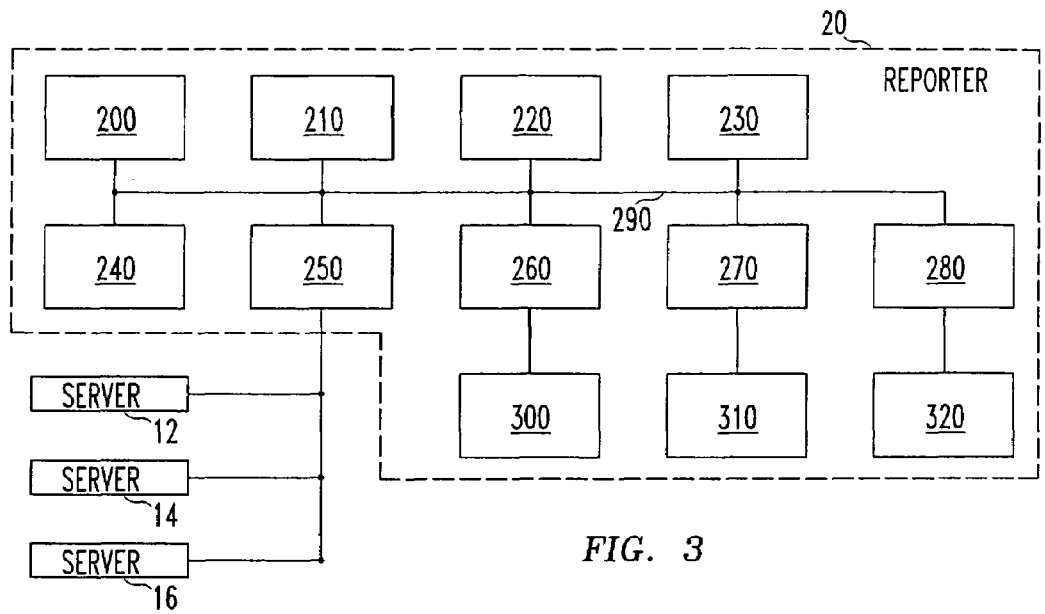
FIG. 3 is a block diagram of a server that may be used as the reporter server in the system of FIG. 1.

As will be understood by those of ordinary skill in the art, any suitable application servers and Reporter server may be used in the practice of this invention. As an illustrative example, FIG. 3 shows details of one server that may be used as Reporter 20. Server 20 comprises a system random access memory (RAM) 200, a system read only memory (ROM) 210, a central processing unit (CPU) 220, a mass storage device 230 comprising one or more large capacity magnetic disks or similar data recording media, one or more removable storage means 240 such as floppy disk drives, CD ROM drives and the like, a network adaptor 250, a keyboard adaptor 260, a pointing device adaptor 270, and a display adaptor 280, all interconnected via a bus architecture 290. A keyboard 300 is coupled to the bus architecture 290 via the keyboard adaptor 260. Similarly, a pointing device 310, such as a mouse, touch screen, tablet, tracker ball or the like, is coupled to the bus architecture 290 via the pointing device adaptor 270. Equally, a display, liquid crystal (LCD) panel, or the like, is coupled to the bus architecture 290 via the display adaptor 280. Additionally, the DSM server 10 is coupled to the servers 12, 14, 16 via the network adaptor 250.

Basic input output system (BIOS) software is stored in the ROM 210 for enabling data communications between the CPU 220, mass storage 230, RAM 200, ROM 210, removable storage 240, and adaptors 250–280 via the bus architecture 290. Stored on the mass storage device 230 is operating system software and application software. Further application software may be loaded into the server 20 via the removable storage 240 or the network adaptor 280. The operating system software enables the server 20 to select and run the application software. The application software stored in the server 20 is capable of receiving and storing incoming e-mails such as Lotus Notes/Domino.

Figure 4:
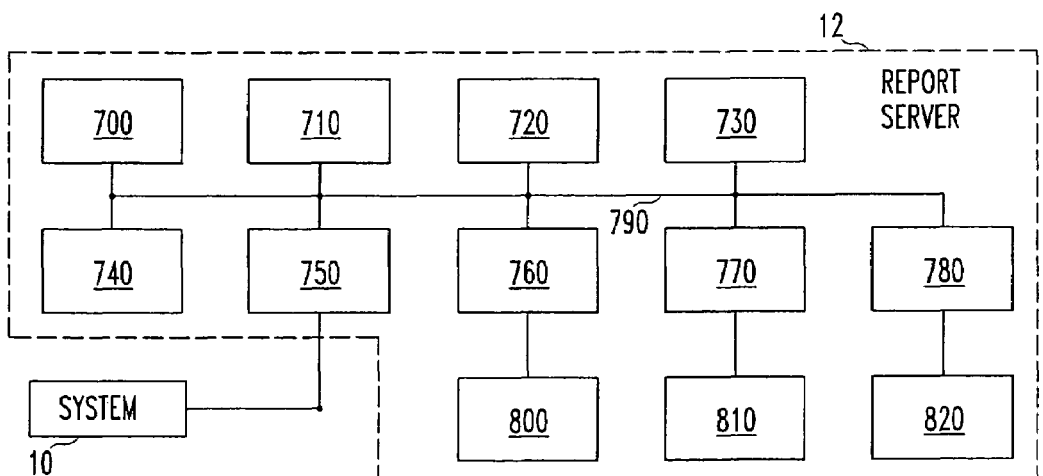
FIG. 4 is a block diagram of a server that may be used as an application server in the system of FIG. 1.

Also, as an illustrative example, FIG. 4 shows details of a server that may be used as servers 12, 14, 16. The application servers 12, 14, 16 contain software such as Lotus Notes/Domino that is capable of generating system logs and sending out e-mails. This application server comprises a system random access memory (RAM) 700, a system read only memory (ROM) 710, a central processing unit (CPU) 720, a mass storage device 730 comprising one or more large capacity magnetic disks or similar data recording media, one or more removable storage means 740 such as floppy disk drives, CD ROM drives and the like, a network adaptor 750, a keyboard adaptor 760, a pointing device adaptor 770, and a display adaptor 780, all interconnected via a bus architecture 790. A keyboard 800 is coupled to the bus architecture 790 via the keyboard adaptor 760. Similarly, a pointing device 810, such as a mouse, touch screen, tablet, tracker ball or the like, is coupled to the bus architecture 790 via the pointing device adaptor 770. Equally, a display output device 820, such as a cathode ray tube (CRT) display output device (LCD) panel, or the like, is coupled to the bus architecture 790 via the display adaptor 780. Additionally, the each application server 12, 14, 16 is coupled to the Reporter server 20 and to remote client terminals or work stations via the network adaptor 750.

It will be appreciated preferably the Reporter server is located in terms of system hierarchy, between the application servers 12, 14, 16 and 95 the administration terminal or work station. In operation the Reporter Server operates as a mid-level systems manager. In operation, the application servers 12, 14, 16 record data transfers in which they are involved, such as message and E Mail to or from the connected client terminals or work stations, in log files. The log files maintained by the application servers 12, 14, 16 are directed to the Reporter server 20. The server 20 processes the received log files to reduce the amount of reporting information sent to the administration terminal or work station.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

The invention claimed is:

1. A method of reporting the availability of application servers in a distributed computer system, said system including a plurality of application servers, a reporter server and an administration terminal, wherein the application server and the reporter server are all interconnected via a network, the method comprising the steps:

each of the application servers providing a services to a set of clients;

the application servers collecting, in log files, data about the application servers, said data including information identifying when each of the application servers was started and stopped and data relating to why the server stopped operating, including the step of each of the application servers periodically searching one of the log files for indication of a crash or shutdown or start of the server, and computing the time said crash or shutdown or start occurred;

connecting the reporter server in series between the application servers and the administration terminal; each of the application servers pushing by electronic mail at least one of said log files including said information, to the reporter server by electronic mail;

operating the reporter server as a mid-level systems manager by receiving said log files and processing said log files to reduce the amount of information sent to the administration terminal, including the steps of, for each of the application servers, sorting said received electronic mails by order received, calculating the duration of downtime for each said crash or said shutdown, and displaying for each of the application servers said duration of downtime in said order;

the reporter server comprising a random access memory, a system read only memory (ROM) including input/output system software, a central processing unit, a mass storage devices comprising at least one magnetic disk and including operating system software and application software, at least one removable storage means including a removable disk drive, a network adapter, a keyboard, a keyboard adapter, a pointing device, a pointing device adapter, a liquid crystal display panel, a display adapter, and a bus architecture; and each of the application servers comprising software for generating system logs and sending out electronic mail, random access memory, read only memory, a central processing unit, a mass storage device comprising at least one magnetic disk, at least one removable storage means including a removable disk drive, a network adapter, a keyboard, a keyboard adapter, a pointing device, a pointing device adapter, a liquid crystal display panel, a display adapter, and a bus architecture.

2. A method according to claim 1, comprising the further step of displaying said method on multiple domains; and wherein the pushing step includes the step of using the server's built in e-mail capability to send the data to the reporter server to reduce, by 250 times, storage and bandwidth requirements of the reporter server needed to receive and to store said information.

* * * * *